UNITED STATES PATENT OFFICE.

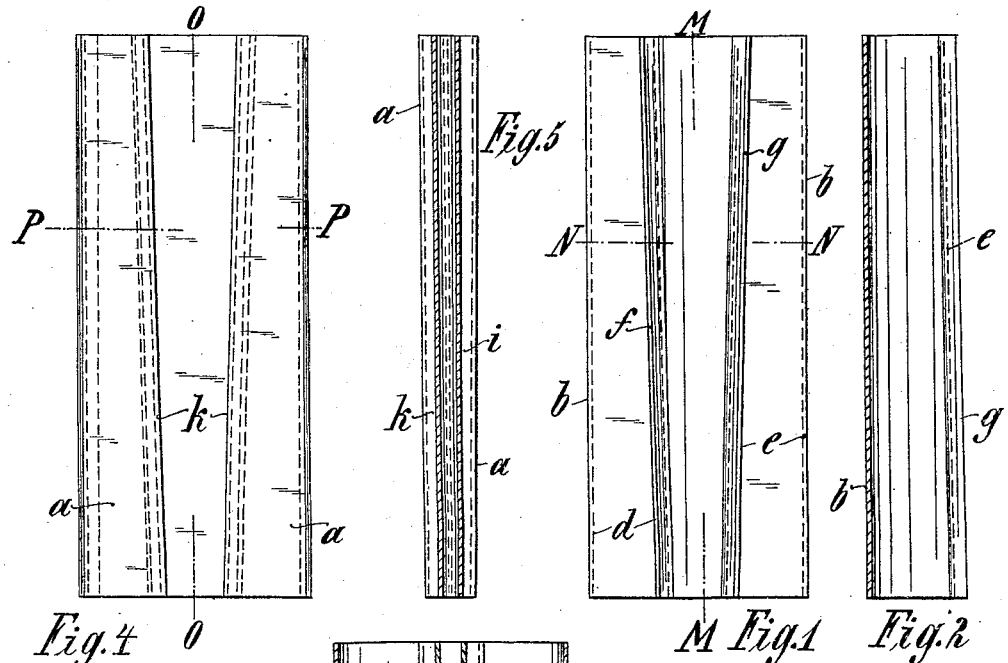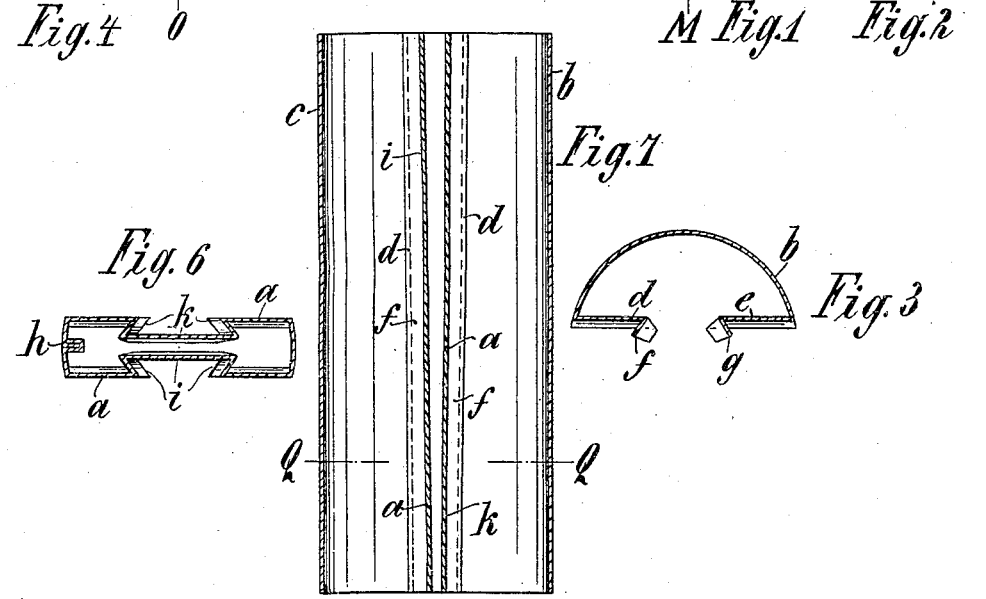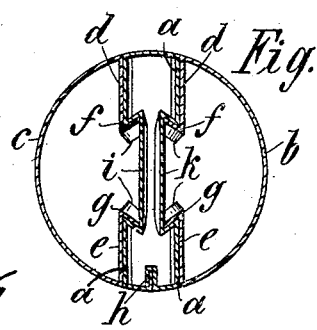

MATTHAEUS WOERNER, OF LEIPZIG, GERMANY.

CONSTRUCTION OF HOLLOW BODIES.

No. 930,012.  Specification of Letters Patent.  Patented Aug. 3, 1909.

Application filed October 18, 1907. Serial No. 398,107.

*To all whom it may concern:*

Be it known that I, MATTHAEUS WOERNER, a subject of the King of Bavaria, residing at Leipzig, in the Kingdom of Saxony, German Empire, whose post-office address is No. 12 Albert street, Leipzig, have invented a certain new and useful Improved Construction of Hollow Bodies, of which the following is a full, clear, and exact description.

The present invention relates to hollow bodies of sheet metal, paste-board, celluloid or other substances, such as are used in making toys and for many other purposes and consists in the improved construction of the same. According to the invention these bodies are made of several sections which are stamped or pressed out of the metal or the like and formed with tapered dove-tails and dove-tail grooves, so that the sections may be easily fitted together and secured in position by simply jamming them one against the other.

In order to render the present specification easily intelligible reference is had to the accompanying drawing in which similar letters of reference denote similar parts throughout the several views:—

Figure 1 is an inside view of one section of a hollow cylindrical body, Fig. 2 a section on line M—M of Fig. 1 and Fig 3 a section on line N—N of Fig. 1: Fig. 4 is a side elevation of the central section of the said cylindrical body, Fig. 5 a section on line O—O of Fig. 4 and Fig. 6 a section on line P—P of Fig. 4: Fig. 7 is an elevation of the body fitted together, and Fig. 8 is a cross section on line Q—Q of Fig. 7.

In the example illustrated the hollow cylinder is divided into three parts *a b* and *c* axially, the parts *b* and *c* being similar in shape and *a* forming the central part or section. The parts *b* and *c* are formed by pressing or stamping the material, turning the flanges *d* and *e* inwardly and then forming the dove-tail flanges *f* and *g*, which latter taper toward one end of the cylinder. The central portion *a* is formed of a single sheet of the material, having its opposite ends curved to complete the cylinder mantle when the parts art fitted together and having two dove-tail grooves *i* and *k* formed along its flat sides and tapered to correspond with and receive the dovetail flanges *f* and *g* of the two sections *b* and *c*. The ends of the piece of sheet material are folded to form a hook and a ledge at *h*, the said ledge being sprung into the said hook as will be readily understood. To form the whole the dove-tail flanges are simply slid into the dove-tail grooves of the central portion and the whole jammed together.

It will be readily understood that other than cylindrical bodies may be made in the same way, the cylindrical having been chosen as an illustration for the sake of simplicity.

I claim as my invention:—

A hollow body consisting of sections the exterior of which form the outer configuration of the said body, and the interior surfaces of which are provided with tapered dovetails and corresponding dovetailed tapered grooves, the said dovetails and dovetailed grooves forming an integral part of each section and being invisible from the exterior.

In testimony whereof I affix my signature in the presence of two witnesses.

MATTHAEUS WOERNER.

Witnesses:
 MORITZ SPREEN,
 RUDULPH FRICKE.